United States Patent [19]

Sreeves

[11] 4,248,757
[45] Feb. 3, 1981

[54] LIQUID COATING COMPOSITIONS

[75] Inventor: John E. Sreeves, Solihull, England

[73] Assignee: British Industrial Plastics, Limited, Manchester, England

[21] Appl. No.: 76,362

[22] Filed: Sep. 17, 1979

[30] Foreign Application Priority Data

Sep. 27, 1978 [GB] United Kingdom ............... 38256/78

[51] Int. Cl.$^3$ ......................... C08K 5/07; C08L 67/02
[52] U.S. Cl. ............................... 260/32.8 N; 428/482; 428/483; 525/158
[58] Field of Search .................. 525/158; 260/32.8 N, 260/22 CB

[56] References Cited

U.S. PATENT DOCUMENTS

| | | | |
|---|---|---|---|
| 3,338,743 | 8/1967 | Laganis | 260/32.8 N |
| 3,607,975 | 9/1971 | Tsukada et al. | 260/32.8 N |
| 4,018,966 | 4/1977 | Antlfinger et al. | 260/32.8 N |

*Primary Examiner*—Theodore E. Pertilla
*Attorney, Agent, or Firm*—Stevens, Davis, Miller & Mosher

[57] ABSTRACT

A liquid coating composition comprises the following ingredients A, B and C dissolved in the following weight proportions in an organic solvent:

A. A non-oxidizing oil-free cross-linking alkyl resin containing free carboxylic acid groups, 20–60%,
B. An alkylated amino-formaldehyde resin, 15–60%
C. A vinyl chloride/vinyl acetate copolymer which contains free primary hydroxyl groups, free carboxylic acid groups or oxirane groups, 5–50%

The composition is particularly suitable for application to flexible PVC sheet, and is heat-curable to a film whose adhesion to such sheet does not seriously deteriorate on aging.

6 Claims, No Drawings

LIQUID COATING COMPOSITIONS

This invention relates to liquid coating compositions such as lacquers and paints, and more particularly to liquid coating compositions suitable for application to flexible polyvinylchloride (PVC) sheet.

Among the compositions available for coating flexible substrates of plastics material are several that meet the requirement for use with PVC sheet, that they should, at a substrate temperature of not more than about 95° C., be curable within one minute to a film that will not stick to itself on subsequent reeling or stacking of the coated sheet. However, it is a matter of great difficulty to formulate a composition which will when applied to a PVC substrate, continue to adhere to the PVC as time passes. Poor adhesion on aging is probably due to the migration to the PVC surface of plasticisers or other components that are initially uniformly distributed throughout the body of the sheet, with consequent weakening of the bond between the sheet and the film of cured coating composition.

The liquid coating composition of this invention provides a coating which is heat-curable to a film of improved adhesion to flexible PVC surfaces on aging. The composition comprises three essential ingredients A, B and C dissolved in the following proportions by weight in an organic solvent:

A: a non-oxidizing (non-drying) oil-free cross-linking alkyd resin containing free carboxylic acid groups . . . 20–60%.

B: an alkylated amino-formaldehyde resin . . . 15–60%

C: a vinyl chloride/vinyl acetate copolymer which contains free primary hydroxyl groups, free carboxylic acid groups or oxirane groups . . . 5–50%.

Preferably, the alkylated amino-formaldehyde resin is an alkylated urea-formaldehyde resin, and particularly one in which the alkylating (etherifying) group is n-butyl or isobutyl.

Preferably, the ingredient C contains at least 75% by weight of combined vinyl chloride.

Preferred proportions of the ingredients are (by weight of resin solids) in the range C:A+B=1:1–1:9; and particularly preferred proportions are in the range C:A+B=1:3–1:6.

A variety of organic liquids, singly or in admixture with one another, may be used as a solvent component of the coating composition of the invention, but most suitably a lower aliphatic ketone (preferably one containing not more than 6 carbon atoms) is employed, optionally in admixture with a liquid aromatic hydrocarbon such as toluene or xylene.

Flexible PVC sheet coated with a film of cured composition according to the invention can, without damaging either the film or the film/substrate bond, be written on with dry-wipe marking inks containing highly penetrative solvent such as butyl acetate.

The compositions of the invention, which can be used to form highly adherent films on substrates other than those of PVC, are suitably applied in an amount such as to give a cured film having a thickness of the order of 0.01 mm, which ordinarily corresponds to an applied film thickness of the order of 0.1 mm.

The invention is further illustrated by the following Examples:

EXAMPLE 1

The following ingredients were dissolved in a mixture of methyl ethyl ketone (20 parts by weight) and methyl isobutyl ketone (21.7 parts).

|  | Parts by weight | Parts by weight of resin solids | |
|---|---|---|---|
| 1. Alkyd Resin (BA 503) | 26.6 | 18.6 | (42%) |
| 2. Alkylated amino-formaldehyde resin (BE 678) | 18.4 | 12.5 | (28%) |
| 3. Vinyl chloride/vinyl acetate copolymer containing hydroxy groups (VINYLITE VROH) | 13.3 | 13.3 | (30%) | curing catalyst (0.4 parts by weight): p-toluenesulphonic acid 1. is a non-drying oil-free cross-linking alkyd resin in isopropanol, of viscosity 10–25 poise (1–2.5 Pascal second) at 25° C., and acid value (mg.KOH/g.) 44–50; available from British Industrial Plastics Ltd.
2. is an isobutylated urea-formaldehyde resin in isobutanol, of viscosity 4.7–7.3 Pascal seconds at 25° C., and acid value 1.5–3.0; available from British Industrial Plastics Ltd.
3 is a vinyl chloride/vinyl acetate copolymer containing reactive primary hydroxyl groups, of combined vinyl chloride content 80% by weight and —OH group content 2% by weight, and viscosity (at 40% by weight concentration in methyl ethyl ketone/toluene/butanol 70:20:10) 0.6 Pascal seconds at 25° C.; available from Union Carbide.

The coating composition was applied as a film about 0.1 mm thick to a flexible sheet of PVC, and the coated sheet was then baked (air temperature, 120° C.) in an oven for 1 minute. The maximum temperature that the PVC reached was 93° C.

As soon as the sheet had cooled the film of cured coating composition on it was tested and found to be flexible and free from tackiness, and to suffer no damage when marked with a dry-wipe ink containing butyl acetate.

The coated PVC sheet was artificially aged for 10 days at 40° C., and during that time the adhesion of the film to the substrate was found to be unaffected. After a further 2-months aging at ambient temperature (20° C.) there was still no deterioration in the bond.

EXAMPLE 2

A heat-curable coating composition was prepared by dissolving the following ingredients in methyl ethyl ketone (44.5 parts by weight).

|  | Parts by weight | Resin Solids | |
|---|---|---|---|
| 1. Alkyd resin (BA 503) | 23.0 | 16 (40%) | |
| 2. Alkylated amino-formaldehyde resin (BE 678) | 24.5 | 16 (40%) | |
| 3. Vinyl chloride/vinyl acetate copolymer containing free carboxylic acid Groups (VINYLITE VMCA) | 8.0 | 8 (20%) | | curing catalyst (0.4 parts by weight): p-toluenesulphonic acid 3 is a vinyl chloride/vinyl acetate copolymer containing free carboxylic acid groups, of combined vinyl chloride content 81% by weight, vinyl acetate content 17% by weight, with 2% by weight inter-polymerised dibasic acid (0.7–0.8 carboxyl). It can be replaced by an equal weight of VINYLITE VMCH (86% vinyl chloride, 13% vinyl acetate, 1% inter-polymerised dibasic acid) or VINYLITE VERR (78% vinyl chloride, 21% vinyl acetate, 1% oxirane oxygen. All three are available from Union Carbide.

EXAMPLES 3, 4 and 5

Heat-curable coating compositions were prepared from the following materials in the following parts by weight.

|  | Example 3 | Example 4 | Example 5 |
|---|---|---|---|
| 1. Alkyd resin (BA 503) | 23.0 | 21.3 | 23.5 |
| 2. Alkylated amino-formaldehyde resin (BE 678) | 24.5 | 22.7 | 24.5 |
| 3. Vinyl chloride/vinyl acetate copolymer containing free carboxylic acid groups (VINYLITE VMCA) | 8.1 | 7.6 | 8.0 |
| 4. Methyl ethyl ketone | 18.9 | 17.5 | 20.2 |
| 5. Xylene | 17.5 | 23.6 | 23.2 |
| 6. Micronised silica gel | 7.0 | 6.3 | — |
| 7. Polytetrafluoroethylene | — | 1.0 | — |
| 8. Silicone resin | 1.0 | — | — |
| 9. Phthalocyanine pigment | — | — | 0.8 |

Curing catalyst (0.4 parts by weight):p-toluenesulphonic acid 6. provides a matt finish in the eventual heat-cured film. Suitable micronised products are Gasil 937 and Gasil 34 of Joseph Crosfield and Sons Ltd.
7. e.g. FLUON 169 B of ICI Ltd. improves abrasion resistance in the eventual heat-cured film.
8. Improves the resistance of the film to scratching, and is suitably the product Byk 300 of Byk-Mallinckrodt Ltd.
9. (blue pigment) is suitably Monastral Blue B9 of ICI Ltd.

I claim:

1. A liquid coating composition which comprises ingredients A, B and C dissolved in the following weight proportions in an organic solvent:
   A. a non-oxidizing oil-free cross-linking alkyd resin containing free carboxylic acid groups, 20–60%;
   B. an alkylated amino-formaldehyde resin, 15–60%;
   C. a vinyl chloride/vinyl acetate copolymer which contains free primary hydroxyl groups, free carboxylic acid groups or oxirane groups, 5–50%, the proportions of the ingredients being (by weight of resin solids) in the range C:A+B=1:1–1:9.

2. A composition according to claim 1, in which the alkylated amino-formaldehyde resin is an alkylated urea-formaldehyde resin.

3. A composition according to claim 2, in which the resin is a butylated or isobutylated urea-formaldehyde resin.

4. A composition according to claim 1, in which the proportions C:A+B are in the range 1:3–1:6.

5. A composition according to claim 1 in which the organic solvent includes a lower aliphatic ketone.

6. Flexible PVC sheet having a film of heat-cured coating composition according to claim 1.

* * * * *